United States Patent
Hu (10) Patent No.: US 11,696,123 B2
(45) Date of Patent: Jul. 4, 2023

(54) ELECTRONIC DISTRIBUTION METHOD, APPARATUS AND SYSTEM

(71) Applicant: BOE Technology Group Co., Ltd., Beijing (CN)

(72) Inventor: Kejun Hu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 874 days.

(21) Appl. No.: 16/534,053

(22) Filed: Aug. 7, 2019

(65) Prior Publication Data

US 2020/0288304 A1    Sep. 10, 2020

(30) Foreign Application Priority Data

Mar. 8, 2019    (CN) .......................... 201910175340.0

(51) Int. Cl.
  *H04L 29/06*     (2006.01)
  *H04W 12/033*    (2021.01)
  *H04W 80/02*     (2009.01)
  *H04W 4/80*      (2018.01)
  *H04W 12/041*    (2021.01)

(52) U.S. Cl.
  CPC .......... *H04W 12/033* (2021.01); *H04W 4/80* (2018.02); *H04W 12/041* (2021.01); *H04W 80/02* (2013.01)

(58) Field of Classification Search
  CPC ... H04W 12/033; H04W 4/80; H04W 12/041; H04W 80/02
  USPC .......................................................... 380/33
  See application file for complete search history.

(56) References Cited

U.S. PATENT DOCUMENTS

2015/0229514 A1* 8/2015 Okuyama ............... H04L 67/30
                                                  709/214
2019/0206163 A1* 7/2019 Sakurada ........... G07C 9/00896
(Continued)

FOREIGN PATENT DOCUMENTS

CN       106971430 A      7/2017
CN       206411721 U      8/2017
CN       107358283 A      11/2017
(Continued)

OTHER PUBLICATIONS

First Office Action, including Search Report, for Chinese Patent Application No. 201910175340.0, dated Oct. 28, 2020, 36 pages.
(Continued)

*Primary Examiner* — Evans Desrosiers
(74) *Attorney, Agent, or Firm* — Westman, Champlin & Koehler, P.A.

(57) ABSTRACT

The present disclosure discloses an electronic distribution method and apparatus. The method includes: acquiring user information and first terminal information of a distribution terminal which are transmitted by a server; generating a first key and transmitting the first key to the server; acquiring second terminal information which is encrypted by the distribution terminal using the first key received from the server and is transmitted by the distribution terminal; decrypting the second terminal information encrypted by using the first key to obtain the second terminal information; matching the second terminal information with the first terminal information; and displaying the user information if the second terminal information matches the first terminal information.

8 Claims, 4 Drawing Sheets

(56) References Cited

U.S. PATENT DOCUMENTS

2019/0222561 A1* 7/2019 Jeong ............... H04W 12/06
2020/0137439 A1* 4/2020 Yoshizawa ......... H04N 21/4122

FOREIGN PATENT DOCUMENTS

| CN | 107392522 A | 11/2017 |
| CN | 107572087 A | 1/2018 |
| CN | 107665415 A | 2/2018 |
| CN | 108009780 A | 5/2018 |

OTHER PUBLICATIONS

Office Action, including search report, for Chinese Patent Application No. 201910175340.0, dated Jun. 9, 2021, 38 pages.

* cited by examiner

ELECTRONIC DISTRIBUTION METHOD, APPARATUS AND SYSTEM

CROSS-REFERENCE TO RELATED APPLICATION(S)

This application claims priority to the Chinese Patent Application No. CN 201910175340.0, filed on Mar. 8, 2019, which is incorporated herein by reference in its entirety.

TECHNICAL FIELD

The present disclosure relates to the field of Internet of Things technology, and more particularly, to an electronic distribution method, apparatus, and system.

BACKGROUND

Nowadays, people are increasingly relying on express delivery, no matter whether they are shopping online or transmitting items, which involves a lot of valuable items, personal private items, etc., and customers do not want information of these express items to be acquired by others for the purpose of protecting personal property or privacy. However, most of the express delivery currently attaches paper labels on the items, which has a low degree of confidentiality, and it is easy for others to acquire relevant information of the customers. Further, once the express items are lost, it is difficult to position and trace the express items.

SUMMARY

According to a first aspect of the embodiments of the present disclosure, there is provided an electronic distribution method, comprising:

acquiring user information and first terminal information of a distribution terminal which are transmitted by a server;

generating a first key and transmitting the first key to the server;

acquiring second terminal information which is encrypted by the distribution terminal using the first key received from the server and is transmitted by the distribution terminal;

decrypting the second terminal information encrypted by using the first key to obtain the second terminal information;

matching the second terminal information with the first terminal information; and displaying the user information if the second terminal information matches the first terminal information.

In an embodiment, displaying the user information comprises:

displaying the user information until a preset time threshold elapses.

In an embodiment, the method further comprises:

receiving a delivery command transmitted by the distribution terminal, wherein the delivery command comprises the second terminal information encrypted by using the first key;

decrypting the second terminal information encrypted by using the first key to obtain the second terminal information;

matching the second terminal information with the first terminal information; and performing delivery if the second terminal information successfully matches with the first terminal information.

In an embodiment, the method further comprises:

acquiring third terminal information of the user terminal which is transmitted by the server;

generating a second key and transmitting the second key to the server;

acquiring fourth terminal information which is encrypted by the user terminal using the second key received from the server and is transmitted by the user terminal;

decrypting the fourth terminal information encrypted by using the second key to obtain the fourth terminal information;

matching the fourth terminal information with the third terminal information; and unlocking a locking apparatus to complete distribution if the fourth terminal information matches the third terminal information.

In an embodiment, the method further comprises:

transmitting a message that the distribution is completed to the server.

In an embodiment, the first terminal information comprises a Bluetooth Media Access Control (MAC) address and/or a Near Field Communication (NFC) chip Identity (ID) of the distribution terminal stored by the server; the second terminal information comprises a Bluetooth MAC address and/or an NFC chip ID stored by the distribution terminal; the third terminal information comprises a Bluetooth MAC address and/or an NFC chip ID of the user terminal stored by the server; and the fourth terminal information comprises a Bluetooth MAC address and/or an NFC chip ID stored by the user terminal.

In an embodiment, the method further comprises:

receiving a position reporting command transmitted by the server; and acquiring positioning information and reporting the positioning information to the server.

According to a second aspect of the embodiments of the present disclosure, there is provided an electronic distribution apparatus, comprising:

a processor; and a memory connected to the processor, and has stored thereon instructions executable by the processor, wherein the instructions, when executed by the processor, cause the processor to be configured to:

acquire user information and first terminal information of a distribution terminal which are transmitted by a server;

generate a first key and transmit the first key to the server;

acquire second terminal information which is encrypted by the distribution terminal using the first key received from the server and is transmitted by the distribution terminal;

decrypt the second terminal information encrypted by using the first key to obtain the second terminal information;

match the second terminal information with the first terminal information; and control a display to display the user information if the second terminal information matches the first terminal information.

In an embodiment, the processor is further configured to control the display to display the user information until a preset time threshold elapses.

In an embodiment, the processor is further configured to:

receive a delivery command transmitted by the distribution terminal, wherein the delivery command comprises the second terminal information encrypted by using the first key;

decrypt the second terminal information encrypted by using the first key to obtain the second terminal information;

match the second terminal information with the first terminal information; and perform delivery if the second terminal information successfully matches with the first terminal information.

In an embodiment, the processor is further configured to:

acquire third terminal information of the user terminal which is transmitted by the server;

generate a second key and transmit the second key to the server;

acquire fourth terminal information which is encrypted by the user terminal using the second key received from the server and is transmitted by the user terminal;

decrypt the fourth terminal information encrypted by using the second key to obtain the fourth terminal information;

match the fourth terminal information with the third terminal information; and unlock a locking apparatus to complete distribution if the fourth terminal information matches the third terminal information.

In an embodiment, the processor is further configured to transmit a message that the distribution is completed to the server.

In an embodiment, the first terminal information comprises a Bluetooth Media Access Control (MAC) address and/or a Near Field Communication (NFC) chip Identity (ID) of the distribution terminal stored by the server; the second terminal information comprises a Bluetooth MAC address and/or an NFC chip ID stored by the distribution terminal; the third terminal information comprises a Bluetooth MAC address and/or an NFC chip ID of the user terminal stored by the server; and the fourth terminal information comprises a Bluetooth MAC address and/or an NFC chip ID stored by the user terminal.

In an embodiment, the processor is further configured to:

receive a position reporting command transmitted by the server;

acquire positioning information; and report the positioning information to the server.

BRIEF DESCRIPTION OF THE ACCOMPANYING DRAWINGS

In order to more clearly illustrate the technical solutions according to the embodiments of the present disclosure, the accompanying drawings of the embodiments will be briefly described below. It is obvious that the accompanying drawings in the following description relate only to some embodiments of the present disclosure, and are not to limit the present disclosure.

DETAILED DESCRIPTION

In order to make the purposes, technical solutions and advantages of the embodiments of the present disclosure more clear, the technical solutions according to the embodiments of the present disclosure will be clearly and completely described below in conjunction with the accompanying drawings of the embodiments of the present disclosure. It is obvious that the embodiments described are a part of the embodiments of the present disclosure, instead of all the embodiments. All other embodiments obtained by those of ordinary skill in the art based on the described embodiments of the present disclosure without any creative work are within the protection scope of the present disclosure.

Unless otherwise defined, technical terms or scientific terms used in the present disclosure should be interpreted in the ordinary sense for those skilled in the art to which the present disclosure belongs. The words such as "first," "second," etc. used in the present disclosure do not mean any order, quantity or importance, but merely serve to distinguish different constituent parts. Similarly, the word such as "a", "an", or "the" etc. also does not mean limitations on quantity, and instead means presence of at least one. The word such as "comprising" or "comprising" etc. means that an element or item preceding the word covers elements or items which appear after the word and their equivalents, but does not exclude other elements or items. The word "connected" or "connecting" etc. is not limited to physical or mechanical connections but may comprise electrical connections, regardless of direct connections or indirect connections. "Upper", "lower", "left", "right", etc. are only used to indicate a relative positional relationship, and after an absolute position of an object which is described changes, the relative positional relationship may also change accordingly.

In a first aspect of the embodiments of the present disclosure, there is proposed an electronic distribution method, which may improve the confidentiality of distribution to a certain extent.

Figure 1:
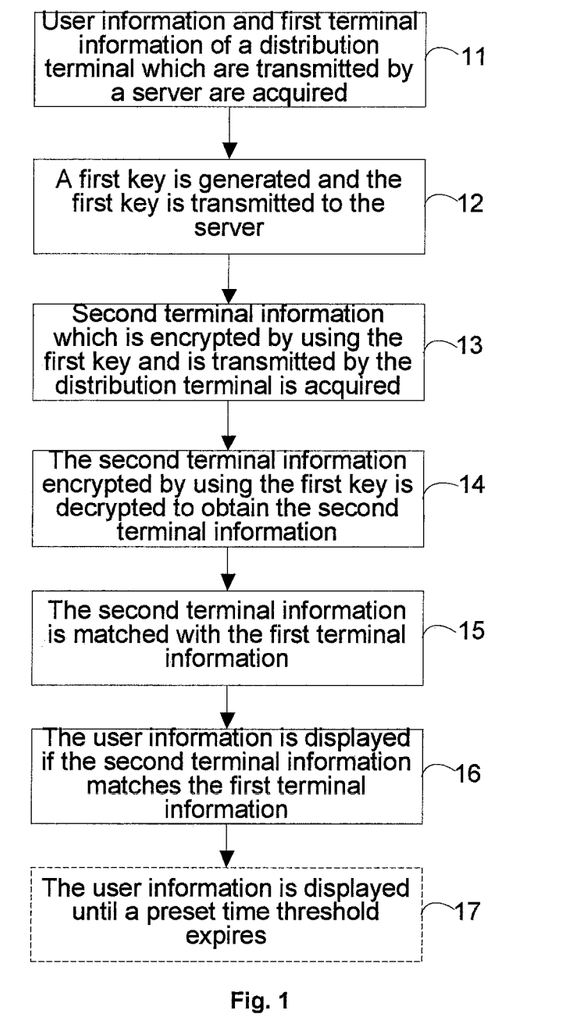
FIG. 1 is a schematic flowchart of a distribution method according to an embodiment of the present disclosure.

As shown in FIG. 1, the electronic distribution method is applied to an electronic distribution apparatus, which specifically is, for example, an electronic distribution box for placing an item to be distributed. The electronic distribution method comprises the following steps.

In step 11, user information and first terminal information of a distribution terminal which are transmitted by a server are acquired.

In an embodiment, when a user needs to use a distribution service, the user initiates a distribution request to the server through a user terminal, wherein the distribution request generally comprises the user information; and when the server receives the distribution request, the server generates a distribution task, determines an electronic distribution apparatus and a distribution terminal, and issues the distribution task to the distribution terminal, so that the server acquires first terminal information of the distribution terminal. Then, the server transmits the user information and the first terminal information of the distribution terminal to the electronic distribution apparatus to be stored by the electronic distribution apparatus for subsequent display and identity verification.

The electronic distribution apparatus is connected with the server using a Narrow Band Internet of Things (NB-IoT) timing. When the electronic distribution apparatus is connected with the server, the server forwards first terminal information of the selected distribution terminal to the electronic distribution apparatus to be stored by the electronic distribution apparatus.

In an embodiment, the user terminal and the distribution terminal may be mobile terminals, and data interaction between the user terminal and the server and data interaction between the distribution terminal and the server may be implemented by APPs of the mobile terminals.

In an embodiment, when the distribution terminal is a mobile terminal, the server may transmit the distribution task to the distribution terminal by using a short message, the distribution terminal receives the corresponding information, for example, an ID of the electronic distribution apparatus, by starting an APP, and at the same time, the APP may automatically transmit first terminal information of the distribution terminal to the server by acquiring the first terminal information in the background.

In an embodiment, when the distribution terminal is used by a dispatcher, the dispatcher also needs to log in to the APP by using a password.

In an embodiment, the first terminal information of the distribution terminal comprises a Bluetooth Media Access Control (MAC) address and/or a Near Field Communication (NFC) chip Identity (ID) of the distribution terminal which is stored by the server, and when data interaction is performed between the distribution terminal and the electronic distribution apparatus, the information of the distribution terminal may be read through Bluetooth and NFC, to perform identity verification, thereby greatly improving efficiency of the data interaction. In an embodiment, the user information mainly comprises content such as a username/name, an address, contact information, etc. of the user.

In step 12, a first key is generated and the first key is transmitted to the server.

In an embodiment, after the electronic distribution apparatus receives the user information and the first terminal information of the distribution terminal, the electronic distribution apparatus generates the first key and forwards the first key to the distribution terminal through the server. In this way, before interaction is subsequently performed between the distribution terminal and the electronic distribution apparatus, the distribution terminal firstly encrypts the terminal information thereof by using the first key and then transmits the encrypted terminal information to the electronic distribution apparatus, so that the interaction process is in an encrypted state, which improves the confidentiality of the distribution.

In an embodiment, after the preliminary data interaction (data reception, key generation, etc.) is completed, an item to be distributed is placed in the electronic distribution apparatus, and then the electronic distribution apparatus is locked, and may not be unlocked until the user passes the identity verification when the user receives the electronic distribution apparatus.

In step 13, second terminal information which is encrypted by using the first key and is transmitted by the distribution terminal is acquired.

In an embodiment, after the dispatcher finds the electronic distribution apparatus, the dispatcher interacts with the electronic distribution apparatus through the distribution terminal, and transmits the second terminal information encrypted by using the first key to the electronic distribution apparatus, to be used by the electronic distribution apparatus to perform identity verification of the distribution terminal.

In an embodiment, if the dispatcher performs identity verification using an APP, the dispatcher needs to log in again through a password to prevent a case where the mobile phone is stolen by others.

In an embodiment, the second terminal information comprises a Bluetooth MAC address and/or an NFC chip ID stored by the distribution terminal. If the distribution terminal accesses the electronic distribution apparatus in an NFC P2P mode, the dispatcher selects NFC communication in the APP, and the APP encrypts the Bluetooth MAC address and the NFC chip ID using the key and then transmits the encrypted Bluetooth MAC address and NFC chip ID to the electronic distribution apparatus; and if the distribution terminal accesses the electronic distribution apparatus in a Bluetooth Low Energy (BLE) mode (for example, the distribution terminal does not support NFC), the distribution terminal needs to firstly activate BLE Bluetooth broadcast of the electronic distribution apparatus by pressing a button, then selects to scan and be connected to the electronic distribution apparatus in a Bluetooth mode in the APP, and then encrypts the Bluetooth MAC address and the NFC chip ID using the key and then transmits the encrypted Bluetooth MAC address and NFC chip ID to the electronic distribution apparatus.

In step 14, the second terminal information encrypted by using the first key is decrypted to obtain the second terminal information.

In step 15, the second terminal information is matched with the first terminal information.

In step 16, the user information is displayed if the second terminal information matches the first terminal information.

In an embodiment, after the electronic distribution apparatus obtains the second terminal information through decryption, if the second terminal information is consistent with the first terminal information stored by the electronic distribution apparatus, binding with the distribution terminal is completed, and the user information is displayed by a display apparatus (which may be, for example, an electronic paper attached on an outer surface of the electronic distribution apparatus).

In an embodiment, if the second terminal information does not match the first terminal information, no information is displayed.

The electronic distribution method further comprises step 17 of displaying the user information until a preset time threshold expires, for example, keeping the display of the user information for 30 seconds and then refreshing the display screen to blank. In this way, the display duration of the user information is limited, to prevent other unrelated persons from viewing the user information, which improves the confidentiality of the user information.

So far, the electronic distribution apparatus completes the binding with the distribution terminal, the electronic distribution apparatus does not display any user information during subsequent transportation, only the dispatcher knows the user information, and if the dispatcher needs to refer to the user information again, the dispatcher needs to perform the above password log-in, NFC or BLE access processes again, so that the display screen may display the user information again.

It may be seen from the above embodiment that in the electronic distribution method according to the embodiment of the present disclosure, firstly, user information and first terminal information of the distribution terminal which are transmitted by the server are received; a first key is generated to be used by the distribution terminal to encrypt the terminal information thereof; after the encrypted terminal information transmitted by the distribution terminal is received, the encrypted terminal information is decrypted and is matched with the terminal information transmitted by the server; and when the matching is successful, the user information is displayed for the dispatcher to view. In this way, both key encryption and information matching are performed, so that the confidentiality of the user information is ensured, and only the dispatcher who passes the identity verification may view the user information, thereby improving the confidentiality of the distribution.

Figure 2:
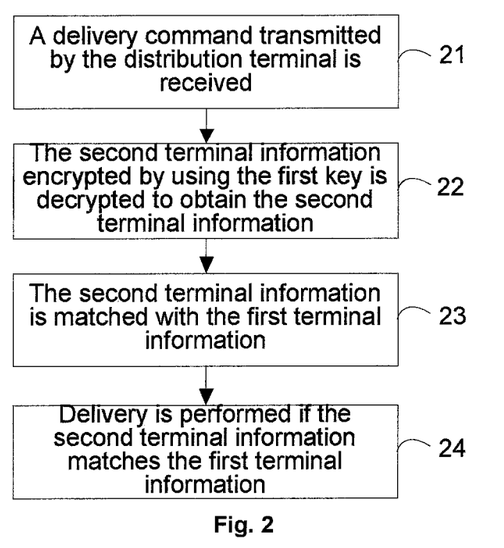
FIG. 2 is a schematic flowchart at the time of delivery according to embodiment of the present disclosure.

As an embodiment of the present disclosure, as shown in FIG. 2, the electronic distribution method further comprises the following steps.

In step 21, a delivery command transmitted by the distribution terminal is received, wherein the delivery command comprises the second terminal information encrypted by using the first key.

In an embodiment, when the dispatcher delivers the electronic distribution apparatus containing an item to be delivered to the user for delivery, the delivery process needs to be initiated by the delivery command, and identity verification of the distribution terminal of the dispatcher also needs to be performed in the delivery process again, that is, the distribution terminal transmits the delivery command to the electronic distribution apparatus, wherein the delivery command comprises second terminal information encrypted by using the first key, and the second terminal information is used for the identity verification.

In an embodiment, before the dispatcher transmits the delivery command using the distribution terminal, the dispatcher also needs to log in to the APP through the password again to improve confidentiality.

In step 22, the second terminal information encrypted by using the first key is decrypted to obtain the second terminal information.

In step 23, the second terminal information is matched with the first terminal information.

In step 24, delivery is performed if the second terminal information matches the first terminal information, and the electronic distribution apparatus enters a state of waiting for confirmation by the customer.

In this way, at the time of delivery, both key encryption/decryption and information matching of the distribution terminal are performed again to complete the delivery, which improves the confidentiality of the delivery process.

Figure 3:
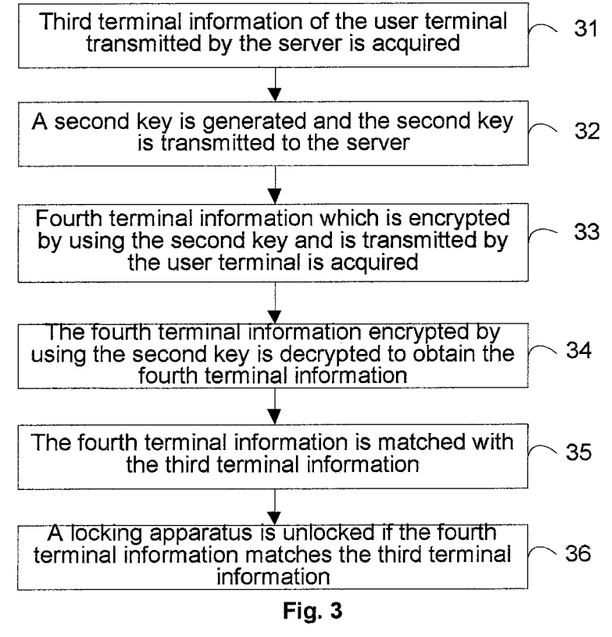
FIG. 3 is a schematic flowchart when a user unlocks a distribution apparatus according to an embodiment of the present disclosure.

As an embodiment of the present disclosure, as shown in FIG. 3, the electronic distribution method further comprises the following steps.

In step 31, third terminal information of the user terminal transmitted by the server is acquired.

In an embodiment, when the user initiates a delivery service to the server through the user terminal, the user terminal may automatically transmit the user information and third terminal information of the user terminal to the server. The third terminal information comprises a Bluetooth MAC address and/or an NFC chip ID of the user terminal stored by the server. After the server determines a corresponding electronic distribution apparatus, the server may transmit the user information and the third terminal information of the user terminal to the electronic distribution apparatus to be stored by the electronic distribution apparatus for subsequent identity verification.

In step 32, a second key is generated and the second key is transmitted to the server.

In an embodiment, after the electronic distribution apparatus receives the third terminal information of the user terminal, the electronic distribution apparatus generates a second key and forwards the second key to the user terminal through the server, so that before the user terminal subsequently interacts with the electronic distribution apparatus, the user terminal firstly encrypts the terminal information thereof by using the second key and then transmits the encrypted terminal information to the electronic distribution apparatus. In this way, the interaction process is in an encrypted state, which improves the confidentiality of the delivery.

In step 33, fourth terminal information which is encrypted by using the second key and is transmitted by the user terminal is acquired.

In an embodiment, after the user receives the electronic distribution apparatus, the user interacts with the electronic distribution apparatus through the user terminal, and transmits fourth terminal information encrypted by using the second key to the electronic distribution apparatus, to be used by the electronic distribution apparatus to perform identity verification of the user.

If the user performs identity verification using an APP, the user needs to log in using a password to prevent a case where the mobile phone has been stolen by others.

If the user terminal accesses the electronic distribution apparatus in an NFC P2P mode, the user selects NFC communication in the APP, and the APP encrypts the Bluetooth MAC address and the NFC chip ID using the key and transmits the encrypted Bluetooth MAC address and NFC chip ID to the electronic distribution apparatus; and if the user terminal accesses the electronic distribution apparatus in a Bluetooth Low Energy (BLE) mode (for example, the distribution terminal does not support NFC), the user terminal needs to firstly activate BLE Bluetooth broadcast of the electronic distribution apparatus by pressing a button, then selects to scan and be connected to the electronic distribution apparatus in a Bluetooth mode in the APP, and then encrypts the Bluetooth MAC address and NFC chip ID using the key and then transmits the encrypted Bluetooth MAC address and NFC chip ID to the electronic distribution apparatus.

In step 34, the fourth terminal information encrypted by using the second key is decrypted to obtain the fourth terminal information. The fourth terminal information comprises a Bluetooth MAC address and/or an NFC chip ID stored by the user terminal.

In step 35, the fourth terminal information is matched with the third terminal information.

In step 36, if the fourth terminal information matches the third terminal information, which indicates that the user has passed the identity authentication, a locking apparatus of the electronic distribution apparatus is unlocked, and the user takes out the item from the electronic distribution apparatus to complete the delivery.

In this way, when the user turns on the electronic distribution apparatus, both encryption/decryption using the second key and information matching of the user terminal are performed to complete the unlocking of the locking apparatus, and only the user who passes the identity verification may turn on the electronic distribution apparatus, thereby improving the confidentiality of the delivery.

As an embodiment of the present disclosure, the electronic distribution method further comprises:

transmitting the message that the distribution is completed to the server to notify the server that the distribution has been completed, thereby completing the distribution process.

In an embodiment, the electronic distribution apparatus transmits the message that the distribution is completed to the server through NB-IoT, the server stores the order, and the distribution task is completed.

If the electronic distribution apparatus is lost during the transportation process, as an embodiment of the present disclosure, the electronic distribution method further comprises:

receiving a position reporting command transmitted by the server, i.e., receiving a position reporting command issued by the server when the electronic distribution apparatus is connected with the server through NB-IoT; and acquiring positioning information and reporting the positioning information to the server, wherein the positioning information is GPS information, i.e., when receiving the position reporting command, the electronic distribution apparatus turning on a GPS power supply, acquiring the positioning information, and then transmitting the positioning information to the server.

In this way, by setting the positioning function, when the electronic distribution apparatus is lost, the positioning information is reported for positioning and searching, so that the electronic distribution apparatus may be efficiently retrieved.

It may be seen from the above embodiments and arrangement and combination of the embodiments that the distribution method combining the NB-IoT, NFC and GPS technologies according to the embodiments of the present disclosure effectively solves the confidentiality problem of distribution, and has characteristics such as good confidentiality, high security, capability of being positioned in a case of loss, simple system structure, low cost, low power consumption, easy to use, etc. The electronic distribution method according to the embodiments of the present disclosure effectively solves the problem that the confidentiality of the user information is poor and easy to leak in the conventional express delivery distribution process, and may perform accurate positioning in a case of loss. The method may not only guide the dispatcher to deliver the item to the user, but also may effectively protect the user information from being leaked or illegally stolen in the entire transportation process, which realizes highly secure transmission and delivery of items while ensuring ease of use, and may realize reporting of positioning through a wireless system for easy retrieval if the electronic distribution apparatus is lost.

In a second aspect of the embodiments of the present disclosure, there is proposed an electronic distribution apparatus, which may improve the confidentiality of distribution to a certain extent.

Figure 4:
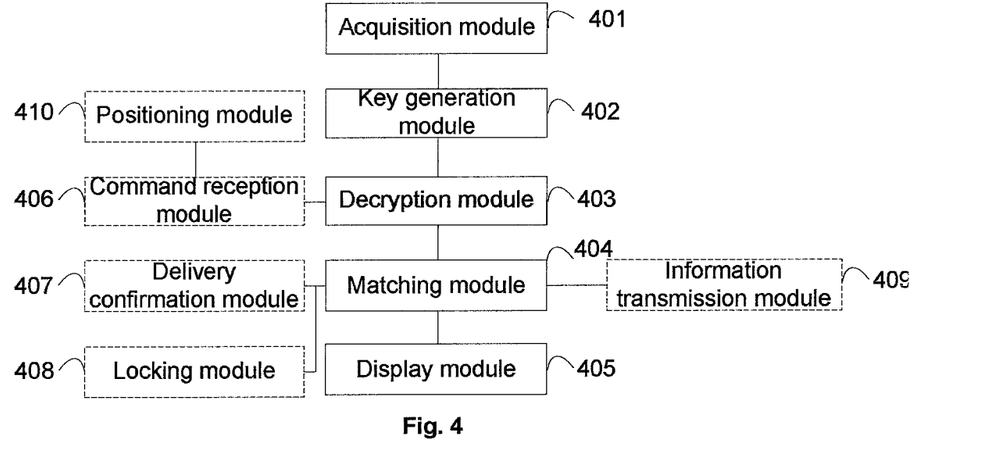
FIG. 4 is a schematic structural diagram of a distribution apparatus according to an embodiment of the present disclosure.

As shown in FIG. 4, the electronic distribution apparatus comprises an acquisition module 401, a key generation module 402, a decryption module 403, a matching module 404, and a display module 405.

The acquisition module 401 is configured to acquire user information and first terminal information of a distribution terminal which are transmitted by a server; and acquire second terminal information which is encrypted by using a first key and is transmitted by the distribution terminal.

In an embodiment, when a user needs to use a distribution service, the user initiates a distribution request to the server through a user terminal, wherein the distribution request generally comprises the user information. When the server receives the distribution request, the server generates a distribution task, determines an electronic distribution apparatus and a distribution terminal, and issues the distribution task to the distribution terminal, so that the server acquires first terminal information of the distribution terminal. Then, the server transmits the user information and the first terminal information of the distribution terminal to the electronic distribution apparatus to be stored by the electronic distribution apparatus for subsequent display and identity verification.

In an embodiment, the electronic distribution apparatus is connected with the server using a Narrow Band Internet of Things (NB-IoT) timing. When the electronic distribution apparatus is connected with the server, the server forwards first terminal information of the selected distribution terminal to the electronic distribution apparatus to be stored by the electronic distribution apparatus. Therefore, as shown in FIG. 5, the acquisition module 401 may comprise an NB-IoT module configured to interact with the server.

Figure 5:
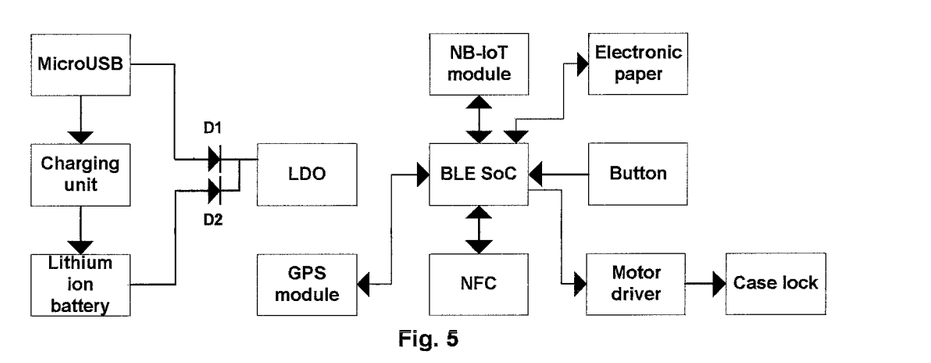
FIG. 5 is a hardware structural block diagram of a distribution apparatus according to an embodiment of the present disclosure.

In an embodiment, as shown in FIG. 5, the acquisition module 401 may further comprise an NFC configured to perform interaction of encrypted data with the user terminal and the distribution terminal.

In an embodiment, the first terminal information of the distribution terminal comprises a Bluetooth Media Access Control (MAC) address and/or a Near Field Communication (NFC) chip Identity (ID) of the distribution terminal which is stored by the server, and when data interaction is performed between the distribution terminal and the electronic distribution apparatus, the information of the distribution terminal may be read through Bluetooth and NFC, to perform identity verification, thereby greatly improving efficiency of the data interaction. The user information may comprise, for example, content such as a username/name, an address, contact information, etc. of the user.

In an embodiment, after the dispatcher finds the electronic distribution apparatus, the dispatcher interacts with the electronic distribution apparatus through the distribution terminal, and transmits the second terminal information encrypted by using the first key to the electronic distribution apparatus, to be used by the electronic distribution apparatus to perform identity verification of the distribution terminal.

In an embodiment, the second terminal information comprises a Bluetooth MAC address and/or an NFC chip ID stored by the distribution terminal. If the distribution terminal accesses the electronic distribution apparatus in an NFC P2P mode, the dispatcher selects NFC communication in the APP, and the APP encrypts the Bluetooth MAC address and the NFC chip ID using the key and then transmits the encrypted Bluetooth MAC address and NFC chip ID to the electronic distribution apparatus; and if the distribution terminal accesses the electronic distribution apparatus in a Bluetooth Low Energy (BLE) mode (for example, the distribution terminal does not support NFC), the distribution terminal needs to firstly activate BLE Bluetooth broadcast of the electronic distribution apparatus by pressing a button (fore example, a button as shown in FIG. 5), then selects to scan and be connected to the electronic distribution apparatus in a Bluetooth mode in the APP, and then encrypts the Bluetooth MAC address and the NFC chip ID using the key and then transmits the encrypted Bluetooth MAC address and NFC chip ID to the electronic distribution apparatus.

The key generation module 402 is configured to generate the first key and transmit the first key to the server.

In an embodiment, after the electronic distribution apparatus receives the user information and the first terminal information of the distribution terminal, the electronic distribution apparatus generates the first key and forwards the first key to the distribution terminal through the server. In this way, before interaction is subsequently performed between the distribution terminal and the electronic distribution apparatus, the distribution terminal firstly encrypts the terminal information thereof by using the first key and then transmits the encrypted terminal information to the electronic distribution apparatus, so that the interaction process is in an encrypted state, which improves the confidentiality of the distribution.

The decryption module 403 is configured to decrypt the second terminal information encrypted by using the first key to obtain the second terminal information.

The matching module 404 is configured to match the second terminal information with the first terminal information.

In an embodiment, as shown in FIG. 5, the key generation module 402, the decryption module 403, and the matching module 404 may be implemented in a processor, and the processor may be implemented using a BLE System-On-Chip (SoC) chip, which supports BLE communication, and thereby may also support a Bluetooth interaction to be used as a supplement to NFC P2P, or may also directly perform interaction of encrypted data with the mobile phone.

The display module 405 is configured to display the user information if the second terminal information matches the first terminal information.

In an embodiment, after the electronic distribution apparatus obtains the second terminal information through decryption, if the second terminal information is consistent with the first terminal information stored by the electronic distribution apparatus, binding with the distribution terminal is completed, and the user information is displayed by a display apparatus (which may be, for example, an electronic paper attached on an outer surface of the electronic distribution apparatus).

In an embodiment, if the second terminal information does not match the first terminal information, no information is displayed.

In an embodiment, as shown in FIG. 5, the display apparatus 405 may be implemented using an electronic paper, so that the display apparatus 405 may be attached on the electronic distribution apparatus for display, without occupying an extra space.

In an embodiment, the display module 405 is further configured to display the user information until a preset time threshold expires, for example, keep the display of the user information for 30 seconds and then refresh the display screen to blank. In this way, the display duration of the user information is limited, to prevent other unrelated persons from viewing the user information, which improves the confidentiality of the user information.

So far, the electronic distribution apparatus completes the binding with the distribution terminal, the electronic distribution apparatus does not display any user information during subsequent transportation, only the dispatcher knows the user information, and if the dispatcher needs to refer to the user information again, the dispatcher needs to perform the above password log-in, NFC or BLE access processes again, so that the display screen may display the user information again.

It may be seen from the above embodiment that in the electronic distribution apparatus according to the embodiment of the present disclosure, firstly, user information and first terminal information of the distribution terminal which are transmitted by the server are received; a first key is generated to be used by the distribution terminal to encrypt the terminal information thereof; after the encrypted terminal information transmitted by the distribution terminal is received, the encrypted terminal information is decrypted and is matched with the terminal information transmitted by the server; and when the matching is successful, the user information is displayed for the dispatcher to view. In this way, both key encryption and information matching are performed, so that the confidentiality of the user information is ensured, and only the dispatcher who passes the identity verification may view the user information, thereby improving the confidentiality of the distribution.

As an embodiment of the present disclosure, the electronic distribution apparatus further comprises a command reception module 406 configured to receive a delivery command transmitted by the distribution terminal, wherein the delivery command comprises the second terminal information encrypted by using the first key.

In an embodiment, when the dispatcher delivers the electronic distribution apparatus containing an item to be delivered to the user for delivery, the delivery process needs to be initiated by the delivery command, and identity verification of the distribution terminal of the dispatcher also needs to be performed in the delivery process again, that is, the distribution terminal transmits the delivery command to the electronic distribution apparatus, wherein the delivery command comprises second terminal information encrypted by using the first key, and the second terminal information is used for the identity verification.

In an embodiment, the command reception module 406 and the acquisition module 401 may realize data interaction with the distribution terminal by using NFC (as shown in FIG. 5), or the command reception module 406 may also realize Bluetooth interaction based on BLE SoC.

The decryption module 403 is configured to decrypt the second terminal information encrypted by using the first key to obtain the second terminal information.

The matching module 404 is configured to match the second terminal information with the first terminal information.

The electronic distribution apparatus further comprises a delivery confirmation module 407, configured to confirm that the delivery is completed if the second terminal information matches the first terminal information, and cause the electronic distribution apparatus to enter a state of waiting for confirmation by the customer. The delivery confirmation module 407 may be integrated in the processor.

In this way, at the time of delivery, both key encryption/decryption and information matching of the distribution terminal are performed again to complete the delivery, which improves the confidentiality of the delivery process.

As an embodiment of the present disclosure, the acquisition module 401 is configured to acquire third terminal information of the user terminal transmitted by the server, and acquire fourth terminal information which is encrypted by using a second key and is transmitted by the user terminal.

In an embodiment, when the user initiates a delivery service to the server through the user terminal, the user terminal may automatically transmit the user information and third terminal information of the user terminal to the server. The third terminal information comprises a Bluetooth MAC address and/or an NFC chip ID of the user terminal stored by the server. After the server determines a corresponding electronic distribution apparatus, the server may transmit the user information and the third terminal information of the user terminal to the electronic distribution apparatus to be stored by the electronic distribution apparatus for subsequent identity verification.

In an embodiment, after the user receives the electronic distribution apparatus, the user interacts with the electronic distribution apparatus through the user terminal, and transmits fourth terminal information encrypted by using the second key to the electronic distribution apparatus, to be used by the electronic distribution apparatus to perform identity verification of the user.

In an embodiment, the fourth terminal information comprises a Bluetooth MAC address and/or an NFC chip ID stored by the user terminal.

In an embodiment, if the user performs identity verification using an APP, the user needs to log in using a password to prevent a case where the mobile phone has been stolen by others. If the user terminal accesses the electronic distribution apparatus in an NFC P2P mode, the user selects NFC communication in the APP, and the APP encrypts the Bluetooth MAC address and the NFC chip ID using the key and transmits the encrypted Bluetooth MAC address and NFC chip ID to the electronic distribution apparatus; and if the user terminal accesses the electronic distribution apparatus in a Bluetooth Low Energy (BLE) mode (for example, the distribution terminal does not support NFC), the user terminal needs to firstly activate BLE Bluetooth broadcast of the electronic distribution apparatus by pressing a button, then selects to scan and be connected to the electronic distribution apparatus in a Bluetooth mode in the APP, and then encrypts the Bluetooth MAC address and NFC chip ID using the key and then transmits the encrypted Bluetooth MAC address and NFC chip ID to the electronic distribution apparatus.

The key generation module 402 is configured to generate the second key and transmit the second key to the server.

In an embodiment, after the electronic distribution apparatus receives the third terminal information of the user terminal, the electronic distribution apparatus generates the second key and forwards the second key to the user terminal through the server, so that before the user terminal subsequently interacts with the electronic distribution apparatus, the user terminal firstly encrypts the terminal information thereof by using the second key and then transmits the encrypted terminal information to the electronic distribution apparatus. In this way, the interaction process is in an encrypted state, which improves the confidentiality of the delivery.

The decryption module 403 is configured to decrypt the fourth terminal information encrypted by using the second key to obtain the fourth terminal information.

The matching module 404 is configured to match the fourth terminal information with the third terminal information.

The electronic distribution apparatus further comprises a locking module 408, configured to, if the fourth terminal information successfully matches the third terminal information, unlock the electronic distribution apparatus, and cause the user to take out the item to complete the delivery. As shown in FIG. 5, the electronic distribution apparatus may comprise a motor driver and a case lock, wherein the motor driver is controlled by the processor to drive the case lock to be turned on and turned off.

In this way, when the user turns on the electronic distribution apparatus, both encryption/decryption using the second key and information matching of the user terminal are performed to complete the unlocking of the electronic distribution apparatus, and only the user who passes the identity verification may turn on the electronic distribution apparatus, thereby improving the confidentiality of the delivery.

As an embodiment of the present disclosure, the electronic distribution apparatus further comprises: an information transmission module 409 configured to transmit the message that the distribution is completed to the server to notify the server that the distribution has been completed, thereby completing the distribution process.

In an embodiment, the electronic distribution apparatus transmits the message that the distribution is completed to the server through NB-IoT, the server stores the order, and the distribution task is completed.

If the electronic distribution apparatus is lost during the transportation process, as an embodiment of the present disclosure, the command reception module 406 is configured to receive a position reporting command transmitted by the server.

The electronic distribution apparatus further comprises a positioning module 410 configured to acquire positioning information. As shown in FIG. 5, the positioning module 410 may be a GPS module, and when the electronic distribution apparatus is lost, the server may wake up the GPS module to report a position through NB-IoT. In an embodiment, the positioning information is GPS information, and when the electronic distribution apparatus receives the position reporting command, the electronic distribution apparatus turns on a GPS power supply, acquires the positioning information, and then transmits the positioning information to the server.

The information transmission module 409 is configured to report the positioning information to the server.

In this way, by setting the positioning function, when the electronic distribution apparatus is lost, the positioning information is reported for positioning and searching, so that the electronic distribution apparatus may be efficiently retrieved.

It may be seen from the above embodiments and arrangement and combination of the embodiments that the electronic distribution apparatus combining the NB-IoT, NFC and GPS technologies according to the embodiments of the present disclosure effectively solves the confidentiality problem of distribution, and has characteristics such as good confidentiality, high security, capability of being positioned in a case of loss, simple system structure, low cost, low power consumption, easy to use, etc. The electronic distribution apparatus according to the embodiments of the present disclosure effectively solves the problem that the confidentiality of the user information is poor and easy to leak in the conventional distribution process, and may perform accurate positioning in a case of loss. The method may not only guide the dispatcher to deliver the item to the user, but also may effectively protect the user information from being leaked or illegally stolen in the entire transportation process, which realizes highly secure transmission and delivery of items while ensuring ease of use, and may realize reporting of positioning through a wireless system for easy retrieval if the electronic distribution apparatus is lost.

In an embodiment, the electronic distribution apparatus is an electronic distribution box for placing an item to be distributed, and at the same time may also enable data interaction with the user terminal, the distribution terminal, and the server.

The electronic distribution box does not have a large data throughput, and does not have a high requirement for performance. From the perspective of low cost and functionality, the BLE SoC (such as a TI CC2541 chip etc.) may be selected, which may not only realize a Micro Control Unit (MCU) master control function, but also support BLE. At the same time, the chip may comprise an Advanced Encryption Standard (AES) 128 encryption and decryption hardware unit to realize subsequent encryption and decryption of NFC P2P data for transmission. The NB-IoT function may be used to perform data interaction with the BLE SoC through a Universal Asynchronous Receiver/Transmitter (UART) port using a module. The NFC P2P function may be implemented by NXP's PN532 chip, which performs data interaction with BLE SoC via a Serial Peripheral Interface (SPI) interface. The GPS module may perform data interaction with the BLE SoC through a serial port, and its power supply is controlled by a Metal-Oxide Semiconductor Field Effect Transistor (MOSFET) to facilitate control of power consumption. A screen of the electronic paper is used to display customer information, including a name, a phone number, an address, etc. of the customer, and may be connected to the BLE SoC via the SPI interface which is multiplexed with the NFC chip. A switch of a box lock of the distribution box is controlled by a motor driving chip, and the BLE SoC realizes the switch of the box lock through an I/O pulse. The button is used to manually activate BLE of the electronic distribution box to start working.

As shown in FIG. 5, the electronic distribution box further has a power supply circuit configured to power and charge the electronic distribution box, and mainly comprises a MicroUSB, a charging unit, a lithium ion battery, a Low Dropout Regulator (LDO), a first diode D1 and a second diode D2.

The electronic distribution box realized by the above solution has advantages such as a simple circuit structure, a low cost of materials and PCB, and simultaneous support for multiple wireless communication protocols, and meets the requirements of convenient use and intelligent confidentiality of the distribution box; at the same time, its operating mode and software design ensure that the system has very low dynamic and static power consumption, and has a long lifetime.

In a third aspect of the embodiments of the present disclosure, there is proposed an electronic distribution system, which may improve the confidentiality of distribution to a certain extent.

Figure 6:
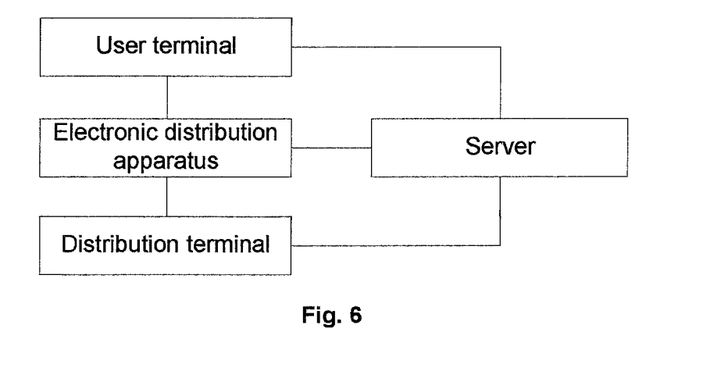
FIG. 6 is a schematic structural diagram of a distribution system according to an embodiment of the present disclosure.

As shown in FIG. 6, the electronic distribution system comprises a server, a distribution terminal, a user terminal, and any of the embodiments of the electronic distribution apparatus as described above or arrangement or combination of the embodiments.

The user terminal is configured to upload the user information to the server.

The distribution terminal is configured to transmit the first terminal information to the server; and transmit the second terminal information encrypted by using the first key to the electronic distribution apparatus.

The server is configured to receive the user information and receive the first terminal information of the distribution terminal, transmit the user information and the first terminal information of the distribution terminal to the electronic distribution apparatus, receive the first key transmitted by the electronic distribution apparatus and transmit the first key to the distribution terminal.

In an embodiment, functions of the server mainly comprise: centralized system management of the electronic distribution apparatus, specifically comprising management of information and a state of the electronic distribution apparatus, management of a distribution task, and monitoring of a distribution process etc. Functions of the electronic distribution apparatus mainly comprise: receiving a distribution task, protecting an item, interacting with a dispatcher and a user, etc. The electronic distribution apparatus may access the Internet through NB-IoT to perform data communication with the server.

In an embodiment, the electronic distribution system further comprises a Personal Computer (PC). Functions of the PC mainly comprise a User Interface (UI), issuing of a distribution task, etc.

It may be seen from the above embodiment that in the electronic distribution system according to the embodiment of the present disclosure, firstly, user information and first terminal information of the distribution terminal which are transmitted by the server are received; a first key is generated to be used by the distribution terminal to encrypt the terminal information thereof; after the encrypted terminal information transmitted by the distribution terminal is received, the encrypted terminal information is decrypted and is matched with the terminal information transmitted by the server; and when the matching is successful, the user information is displayed for the dispatcher to view. In this way, both key encryption and information matching are performed, so that the confidentiality of the user information is ensured, and only the dispatcher who passes the identity verification may view the user information, thereby improving the confidentiality of the distribution.

In an embodiment, the user terminal is further configured to upload the third terminal information of the user terminal to the server; and transmit the fourth terminal information encrypted by using the second key to the electronic distribution apparatus.

The server is further configured to receive the third terminal information of the user terminal, transmit the third terminal information of the user terminal to the electronic distribution apparatus, receive the second key transmitted by the electronic distribution apparatus and transmit the second key to the user terminal.

In addition, the apparatus, device, terminal, etc. described in the present disclosure may typically be various electronic terminal devices, such as a mobile phone, a Personal Digital Assistant (PDA), a Portable Device (PAD), a smart TV, etc., or may also be large terminal devices, such as a server etc., and thus the protection scope of the present disclosure should not be limited to a particular type of apparatus or device. The client described in the present disclosure may be applied to any of the above electronic terminal devices in a form of electronic hardware, computer software, or a combination thereof.

Further, the method according to the present disclosure may also be implemented as a computer program executed by a CPU, which may be stored in a computer readable storage medium. The computer program, when executed by the CPU, executes the above functions defined in the method according to the present disclosure.

Further, the method steps and system units described above may also be implemented with a controller and a computer readable storage medium for storing a computer program which causes the controller to implement the steps or unit functions described above.

In addition, it should be understood that the computer readable storage medium (for example, a memory) described herein may be either a volatile memory or a nonvolatile memory, or may comprise both a volatile memory and a nonvolatile memory. By way of example and not limitation, the non-volatile memory may comprise a Read Only Memory (ROM), a Programmable ROM (PROM), an Electrically Programmable ROM (EPROM), an Electrically Erasable Programmable ROM (EEPROM), or a flash. The volatile memory may comprise a Random Access Memory (RAM), which may act as an external cache memory. By way of example and not limitation, the RAM may be obtained in a variety of forms, such as a Synchronous RAM (SRAM), a Dynamic RAM (DRAM), a Synchronous DRAM (SDRAM), a Double Data Rate SDRAM (DDR SDRAM), an Enhanced SDRAM (ESDRAM), a Synchronous Link DRAM (SLDRAM) and a Direct RambusRAM (DRRAM). The storage device according to the aspects disclosed is intended to comprise, but not limited to, these and other suitable types of memories.

It should also be understood by those skilled in the art that the various illustrative logical blocks, modules, circuits, and algorithm steps described in connection with the present disclosure herein may be implemented as electronic hardware, computer software, or a combination thereof. In order to clearly illustrate this interchangeability of hardware and software, functions of various illustrative components, blocks, modules, circuits, and steps have been generally described. Whether such functionality is implemented as software or as hardware depends on a particular application and design constraints imposed on the overall system. Those skilled in the art may implement the described functions in various ways for each specific application, but such implementation decisions should not be construed as causing a departure from the scope of the present disclosure.

The various exemplary logical blocks, modules, and circuits described in connection with the present disclosure herein may be implemented or executed with the following components designed to perform the functions described herein: general purpose processors, Digital Signal Processors (DSPs), Application Specific Integrated Circuits (ASICs), Field Programmable Gate Arrays (FPGAs) or other programmable logic devices, discrete gates or transistor logics, discrete hardware components, or any combination thereof. The general purpose processor may be a microprocessor, but alternatively, the processor may be any conventional processor, controller, microcontroller, or state machine. The processor may also be implemented as a combination of computing devices, for example, a combination of a DSP and a microprocessor, a plurality of microprocessors, one or more microprocessors in conjunction with a DSP core, or any other such configuration.

The steps of the method or algorithm described in connection with the present disclosure herein may be comprised directly in hardware, in a software module executed by a processor, or a combination thereof. The software module may reside in a RAM memory, a flash, a ROM memory, an EPROM memory, an EEPROM memory, a register, a hard disk, a removable disk, a CD-ROM, or any other form of storage medium known in the art. The exemplary storage medium is coupled to the processor, so that the processor may read information from the storage medium or write information to the storage medium. In an alternative solution, the storage medium may be integrated with the processor. The processor and the storage medium may reside in the ASIC. The ASIC may reside in the user terminal. In an alternative solution, the processor and the storage medium may reside as discrete components in the user terminal.

In one or more exemplary designs, the functions may be implemented in hardware, software, firmware, or any combination thereof. If implemented in software, the functions may be stored on a computer readable medium as one or more instructions or codes or transmitted through a computer readable medium as one or more instructions or codes. The computer readable medium comprises both a computer storage medium and a communication medium comprising any medium which facilitates transfer of a computer program from one position to another. The storage medium may be any available medium which may be accessed by a general purpose or special purpose computer. By way of example and not limitation, the computer readable medium may comprise a RAM, a ROM, an EEPROM, a CD-ROM or other optical disk storage device, disk storage device or other magnetic storage device, or any other medium which may be used for carrying or storing a required program code in a form of instructions or data structure and may be accessed by a general purpose or special purpose computer or a general purpose or special purpose processor. Also, any connection may be properly referred to as a computer readable medium. For example, if a coaxial cable, a fiber cable, a twisted pair, a Digital Subscriber Line (DSL), or wireless technology such as infrared, radio, and microwave is used to transmit software from a website, a server, or other remote source, the coaxial cable, the fiber cable, the twisted pair, the DSL, or the wireless technology such as infrared, radio, and microwave are all comprised in the definition of media. As used herein, a magnetic disk and an optical disk comprise a Compact Disk (CD), a laser disk, an optical disk, a Digital Versatile Disk (DVD), a floppy disk, and a Blue-ray disk, in which the magnetic disk generally reproduces data magnetically, and the optical disk optically reproduces data using a laser. Combinations of the above content should also be comprised within the scope of the computer readable media.

The exemplary embodiments have been disclosed above, but it should be illustrated that there may be a plurality of changes and amendments without departing from the scope of the present disclosure as defined by the claims. The functions, steps and/or actions of the method claims according to the embodiments disclosed herein are not required to be performed in any particular order. In addition, although elements of the present disclosure may be described or claimed in an individual form, a plurality of elements may be conceived unless explicitly limited to a singular form.

It should be understood that as used herein, the singular forms "a", "an", "the" are intended to comprise a plural form unless the context clearly supports exceptions. It should also be understood that "and/or" as used herein is intended to comprise any and all possible combinations of one or more of the associated items listed.

The above serial numbers of the embodiments of the present disclosure are merely for the description, and do not represent advantages and disadvantages of the embodiments.

It may be understood by those of ordinary skill in the art that all or a part of the steps of implementing the above embodiments may be completed by hardware, or may also be completed by a program instructing related hardware, and the program may be stored in a computer readable storage medium. The above storage medium may be a read only memory, a magnetic disk or an optical disk etc.

It should be understood by those of ordinary skill in the art that the discussion of any of the above embodiments is merely exemplary, and is not intended to imply that the scope of the present disclosure (comprising the claims) is limited to these examples. Under the concept of the embodiments of the present disclosure, the technical features in the above embodiments or in the different embodiments may also be combined, there are many other variations of the various aspects of the embodiments of the present disclosure as described above, and details thereof are not provided for the sake of brevity. Therefore, any omissions, modifications, equivalent substitutions, improvements, etc. which are made within the spirit and scope of the embodiments of the present disclosure are intended to be comprised within the protection scope of the embodiments of the present disclosure.

I claim:

1. An electronic distribution method, comprising:
acquiring user information and first terminal information of a distribution terminal which are transmitted by a server;

generating a first key and transmitting the first key to the server;
acquiring second terminal information which is encrypted by the distribution terminal using the first key received from the server and is transmitted by the distribution terminal;
decrypting the second terminal information encrypted by using the first key to obtain the second terminal information;
matching the second terminal information with the first terminal information; and
displaying the user information if the second terminal information matches the first terminal information,
receiving a delivery command transmitted by the distribution terminal, wherein the delivery command comprises the second terminal information encrypted by using the first key;
decrypting the second terminal information encrypted by using the first key to obtain the second terminal information;
matching the second terminal information with the first terminal information; and
performing delivery if the second terminal information successfully matches with the first terminal information,
acquiring third terminal information of the user terminal which is transmitted by the server;
generating a second key and transmitting the second key to the server;
acquiring fourth terminal information which is encrypted by the user terminal using the second key received from the server and is transmitted by the user terminal;
decrypting the fourth terminal information encrypted by using the second key to obtain the fourth terminal information;
matching the fourth terminal information with the third terminal information; and
unlocking a locking apparatus to complete distribution if the fourth terminal information matches the third terminal information,
wherein the first terminal information comprises a Bluetooth Media Access Control (MAC) address and/or a Near Field Communication (NFC) chip Identity (ID) of the distribution terminal stored by the server; the second terminal information comprises a Bluetooth MAC address and/or an NFC chip ID stored by the distribution terminal; the third terminal information comprises a Bluetooth MAC address and/or an NFC chip ID of the user terminal stored by the server; and the fourth terminal information comprises Bluetooth MAC address and/or an NFC chip ID stored by the user terminal.

2. The method according to claim 1, wherein displaying the user information comprises:
displaying the user information until a preset time threshold elapses.

3. The method according to claim 1, further comprising:
transmitting a message that the distribution is completed to the server.

4. The method according to claim 1, further comprising:
receiving a position reporting command transmitted by the server; and
acquiring positioning information and reporting the positioning information to the server.

5. An electronic distribution apparatus, comprising:
a processor; and
a memory connected to the processor, and has stored thereon instructions executable by the processor, wherein the instructions, when executed by the processor, cause the processor to be configured to:
acquire user information and first terminal information of a distribution terminal which are transmitted by a server;
generate a first key and transmit the first key to the server;
acquire second terminal information which is encrypted by the distribution terminal using the first key received from the server and is transmitted by the distribution terminal;
decrypt the second terminal information encrypted by using the first key to obtain the second terminal information;
match the second terminal information with the first terminal information; and
control a display to display the user information if the second terminal information matches the first terminal information,
receive a delivery command transmitted by the distribution terminal, wherein the delivery command comprises the second terminal information encrypted by using the first key;
decrypt the second terminal information encrypted by using the first key to obtain the second terminal information;
match the second terminal information with the first terminal information; and
perform delivery if the second terminal information successfully matches with the first terminal information,
acquire third terminal information of the user terminal which is transmitted by the server;
generate a second key and transmit the second key to the server;
acquire fourth terminal information which is encrypted by the user terminal using the second key received from the server and is transmitted by the user terminal;
decrypt the fourth terminal information encrypted by using the second key to obtain the fourth terminal information;
match the fourth terminal information with the third terminal information; and
unlock a locking apparatus to complete distribution if the fourth terminal information matches the third terminal information,
wherein the first terminal information comprises Bluetooth Media Access Control (MAC) address and/or Near Field Communication (NFC) chip Identity (ID) of the distribution terminal stored by the server; the second terminal information comprises a Bluetooth MAC address and/or an NFC chip stored by the distribution terminal; the third terminal information comprises a Bluetooth MAC address and/or an NFC chip ID of the user terminal stored by the server; and the fourth terminal information comprises a Bluetooth MAC address and/or an NEC chip stored by the user terminal.

6. The apparatus according to claim 5, wherein the processor is further configured to control the display to display the user information until a preset time threshold elapses.

7. The apparatus according to claim 5, wherein the processor is further configured to transmit a message that the distribution is completed to the server.

8. The apparatus according to claim 7, wherein the processor is further configured to:

receive a position reporting command transmitted by the server;
acquire positioning information; and
report the positioning information to the server.

* * * * *